US012624797B2

(12) United States Patent
Baron et al.

(10) Patent No.: US 12,624,797 B2
(45) Date of Patent: May 12, 2026

(54) METHOD FOR ASSEMBLING AND INSTALLING A LIQUEFIED GAS STORAGE TANK

(71) Applicant: GAZTRANSPORT ET TECHNIGAZ, Saint-Rémy-lès-Chevreuse (FR)

(72) Inventors: Paul Baron, Saint-Rémy-lès-Chevreuse (FR); Jocelyn Desbrugeres, Saint-Rémy-lès-Chevreuse (FR); Cédric Felgueiras, Saint-Rémy-lès-Chevreuse (FR)

(73) Assignee: GAZTRANSPORT ET TECHNIGAZ, Saint-Rémy-lès-Chevreuse (FR)

( * ) Notice: Subject to any disclaimer, the term of this patent is extended or adjusted under 35 U.S.C. 154(b) by 235 days.

(21) Appl. No.: 18/029,542

(22) PCT Filed: Oct. 1, 2021

(86) PCT No.: PCT/EP2021/077200
§ 371 (c)(1),
(2) Date: Mar. 30, 2023

(87) PCT Pub. No.: WO2022/069751
PCT Pub. Date: Apr. 7, 2022

(65) Prior Publication Data

US 2023/0366512 A1 Nov. 16, 2023

(30) Foreign Application Priority Data

Oct. 2, 2020 (FR) ....................................... 2010115

(51) Int. Cl.
*F17C 3/02* (2006.01)
*F17C 6/00* (2006.01)
*F17C 9/00* (2006.01)

(52) U.S. Cl.
CPC ................ *F17C 3/027* (2013.01); *F17C 6/00* (2013.01); *F17C 9/00* (2013.01);
(Continued)

(58) Field of Classification Search
None
See application file for complete search history.

(56) References Cited

U.S. PATENT DOCUMENTS 3,339,783 A * 9/1967 Gorman .................... F17C 3/06 220/560.11
3,994,693 A * 11/1976 Parmley .................. F17C 3/027 52/573.1

(Continued)

FOREIGN PATENT DOCUMENTS

DE 1751529 A1 7/1971
EP 3473915 A1 * 4/2019 ............. B63B 25/16

(Continued)

OTHER PUBLICATIONS

KR 20190045065 A English machine translation (Year: 2019).*

(Continued)

*Primary Examiner* — Jenna M Maroney
(74) *Attorney, Agent, or Firm* — Osha Bergman Watanabe & Burton LLP

(57) ABSTRACT

A method for assembling and installing a liquefied gas storage tank, wherein the liquefied gas storage installation includes a load-bearing structure and a sealed and thermally insulated tank arranged in the load-bearing structure, in which so-called adjacent members of a sealing membrane of a cofferdam wall of a main structure of the tank protrude partially into a liquid dome, the so-called adjacent membranes directly sealably fastened to so-called adjacent membranes of the liquid dome.

14 Claims, 5 Drawing Sheets

(52) U.S. Cl.
CPC ................. *F17C 2201/0157* (2013.01); *F17C 2201/052* (2013.01); *F17C 2203/0358* (2013.01); *F17C 2203/0643* (2013.01); *F17C 2203/0646* (2013.01); *F17C 2205/0355* (2013.01); *F17C 2209/22* (2013.01); *F17C 2221/033* (2013.01); *F17C 2227/0135* (2013.01); *F17C 2260/013* (2013.01); *F17C 2270/0107* (2013.01)

(56) References Cited

U.S. PATENT DOCUMENTS

| | | | | | |
|---|---|---|---|---|---|
| 4,050,608 | A * | 9/1977 | Smith | F17C 13/001 52/309.1 |
| 4,155,482 | A * | 5/1979 | Swaney | B65D 90/022 52/406.1 |
| 9,440,712 | B2 * | 9/2016 | Bougault | F17C 3/025 |
| 10,578,248 | B2 * | 3/2020 | Delanoe | F17C 3/027 |
| 10,876,687 | B2 * | 12/2020 | Philippe | B65D 90/22 |
| 12,038,137 | B2 * | 7/2024 | Deletre | F17C 13/001 |
| 2015/0375830 | A1 * | 12/2015 | Bougault | F17C 3/027 220/592.26 |
| 2021/0062972 | A1 * | 3/2021 | Jean | F17C 9/00 |
| 2022/0373133 | A1 * | 11/2022 | Deletre | F17C 3/027 |

FOREIGN PATENT DOCUMENTS

| | | | | |
|---|---|---|---|---|
| FR | 1452604 | A * | 4/1966 | |
| FR | 2861060 | A1 | 4/2005 | |
| FR | 2991430 | A1 | 12/2013 | |
| FR | 3035175 | B1 * | 4/2017 | F17C 13/004 |
| FR | 3049678 | A1 * | 10/2017 | F17C 1/12 |
| FR | 3082916 | A1 * | 12/2019 | B63B 25/16 |
| FR | 3109978 | A1 * | 11/2021 | F17C 13/004 |
| JP | 2001108198 | A * | 4/2001 | |
| KR | 101422522 | B1 * | 7/2014 | |
| KR | 20150039946 | A * | 4/2015 | |
| KR | 1020170049009 | A | 5/2017 | |
| KR | 1020180069780 | A | 6/2018 | |
| KR | 1020190045065 | A | 5/2019 | |
| KR | 20190071181 | A * | 6/2019 | |
| KR | 20200012632 | A * | 2/2020 | |
| WO | WO-2011157915 | A1 * | 12/2011 | B63B 25/16 |
| WO | 2016046487 | A1 | 3/2016 | |
| WO | WO-2016120540 | A1 * | 8/2016 | F17C 13/004 |
| WO | WO-2019215414 | A1 * | 11/2019 | F17C 13/004 |
| WO | 2019239071 | A1 | 12/2019 | |
| WO | 2020008148 | A1 | 1/2020 | |
| WO | WO-2022106692 | A1 * | 5/2020 | |
| WO | WO-2020193584 | A1 * | 10/2020 | F17C 13/004 |
| WO | WO-2020193665 | A1 * | 10/2020 | F17C 13/004 |
| WO | WO-2021028445 | A1 * | 2/2021 | B63B 25/16 |
| WO | WO-2021224071 | A1 * | 11/2021 | B63B 25/16 |
| WO | WO-2023227379 | A1 * | 11/2023 | B63B 25/16 |

OTHER PUBLICATIONS

WO 2019239071 A1 English machine translation (Year: 2019).*
International Search Report and Written Opinion in corresponding International Application No. PCT/EP2021/077200, dated Jan. 21, 2022 (15 pages).
Office Action in corresponding Korean Application No. 10-2023-7010614, dated Aug. 18, 2025 (18 pages).

* cited by examiner

[Fig.1]
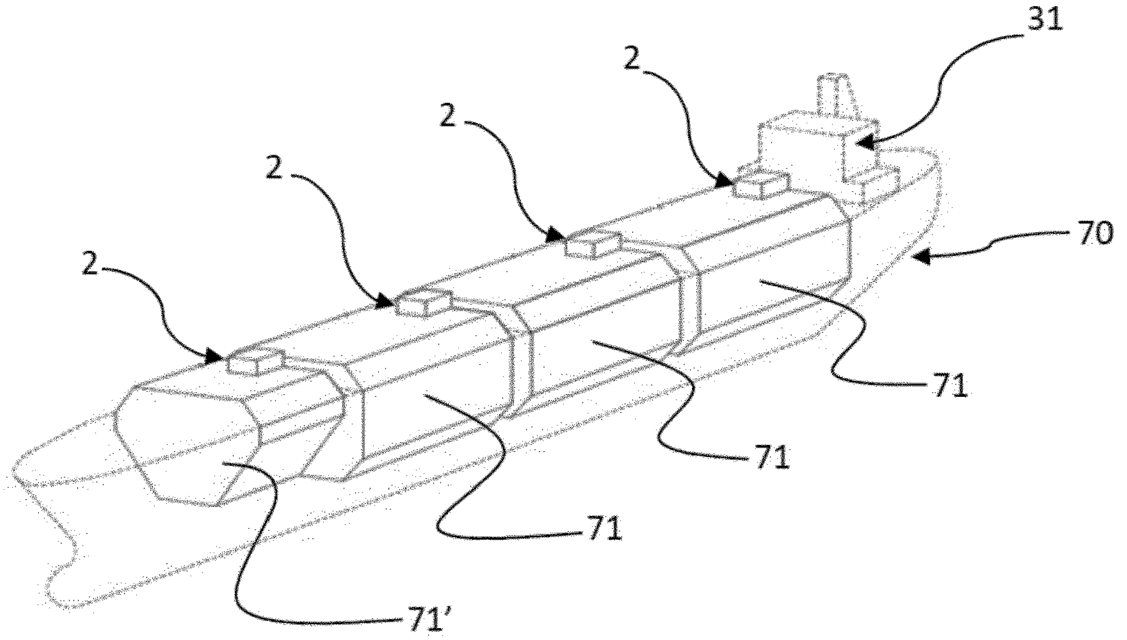
[Fig.2]
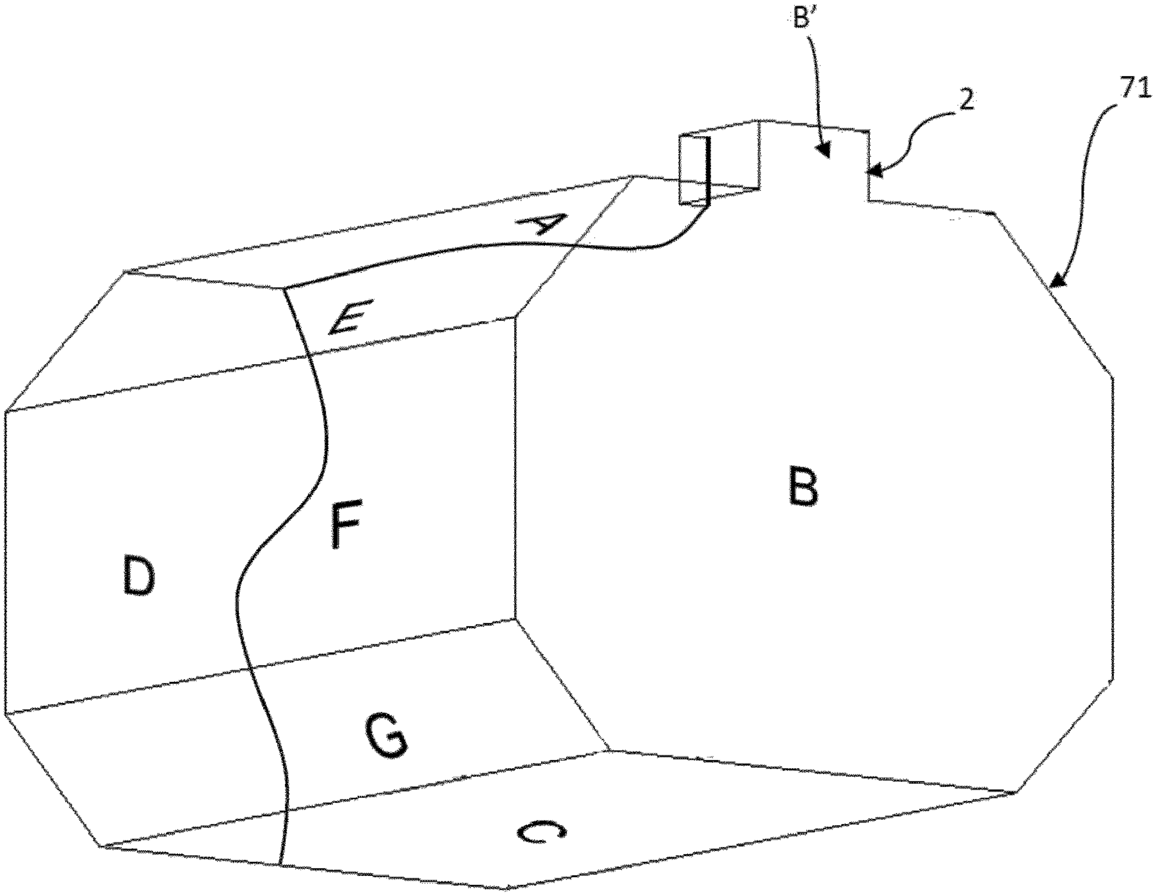

[Fig.3]
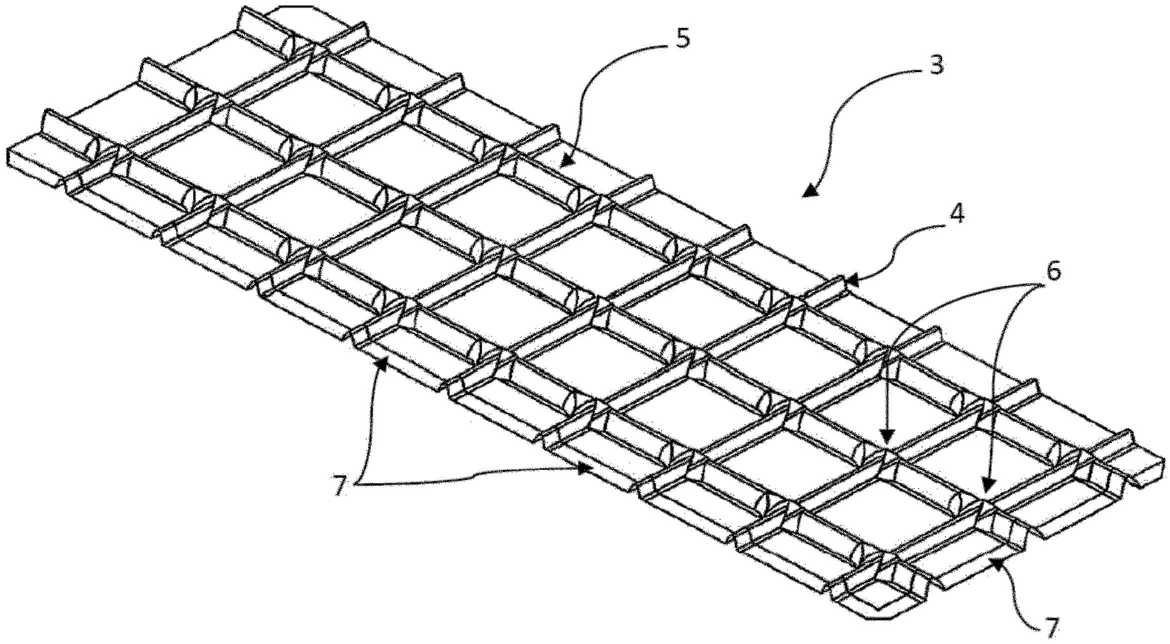
[Fig.4]
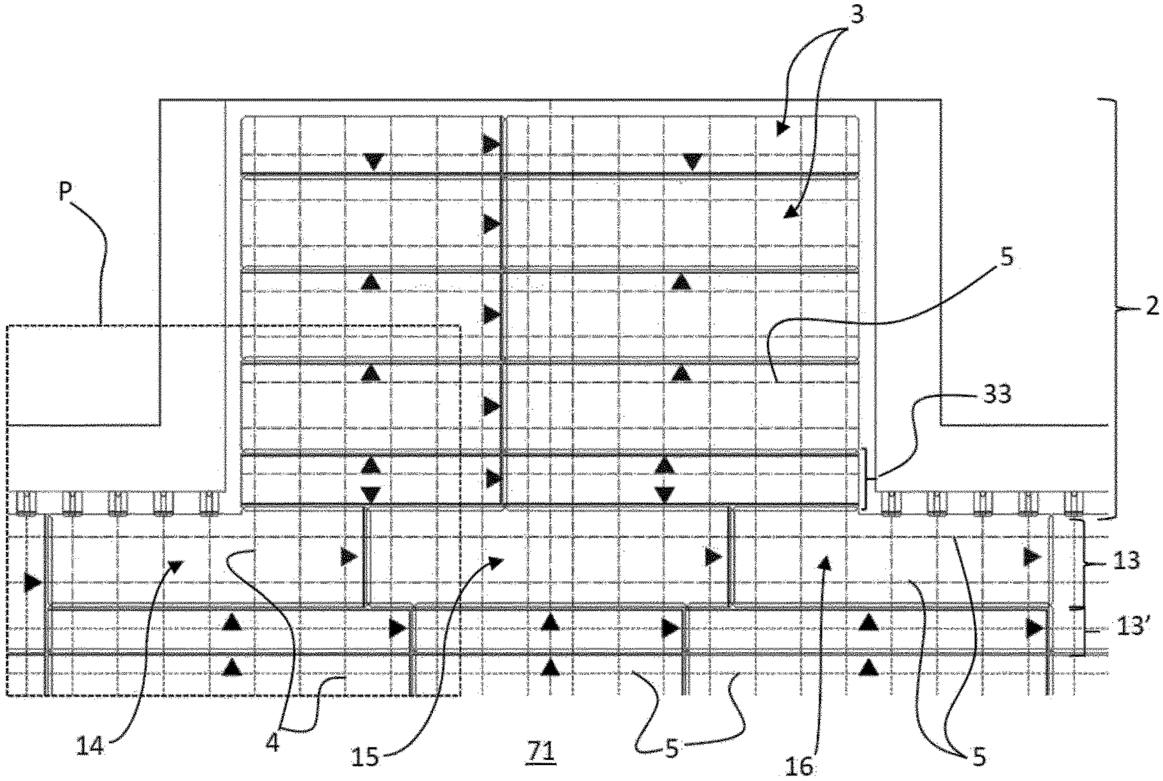

[Fig.5]
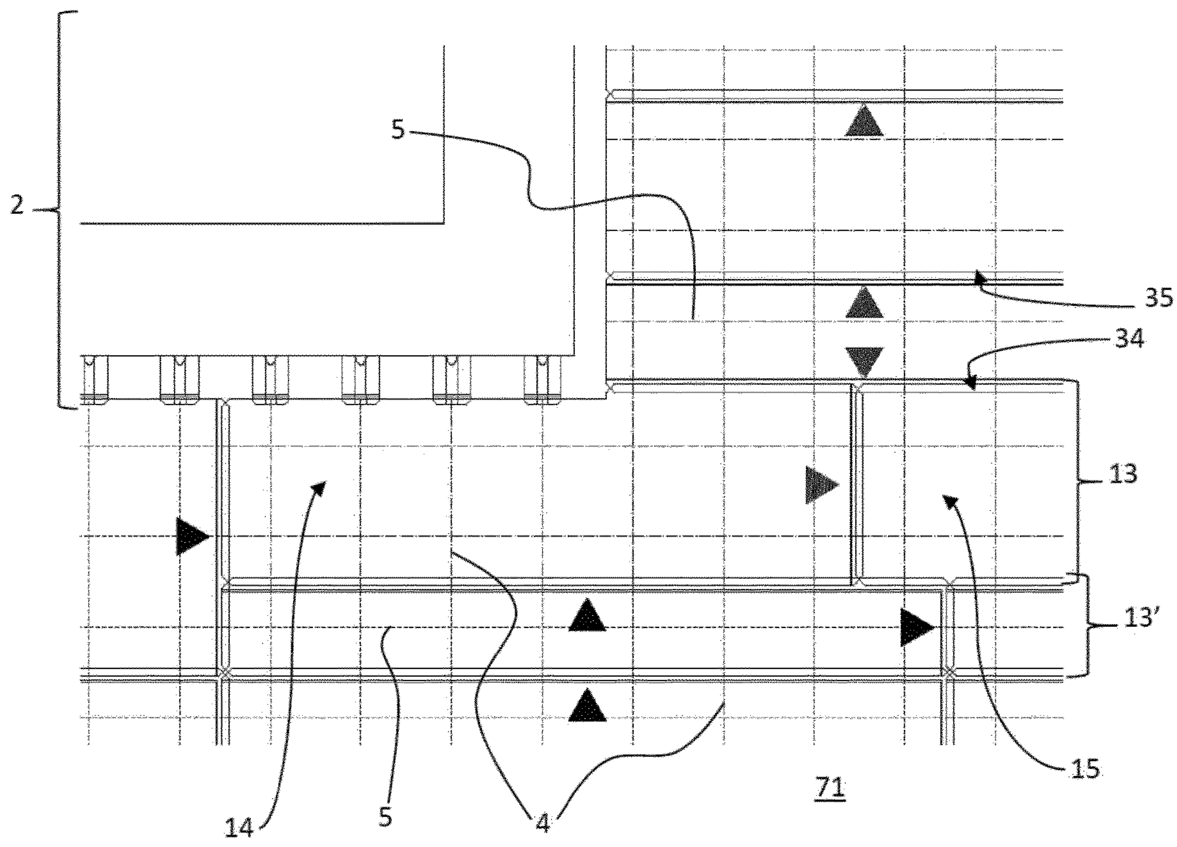
[Fig.6]
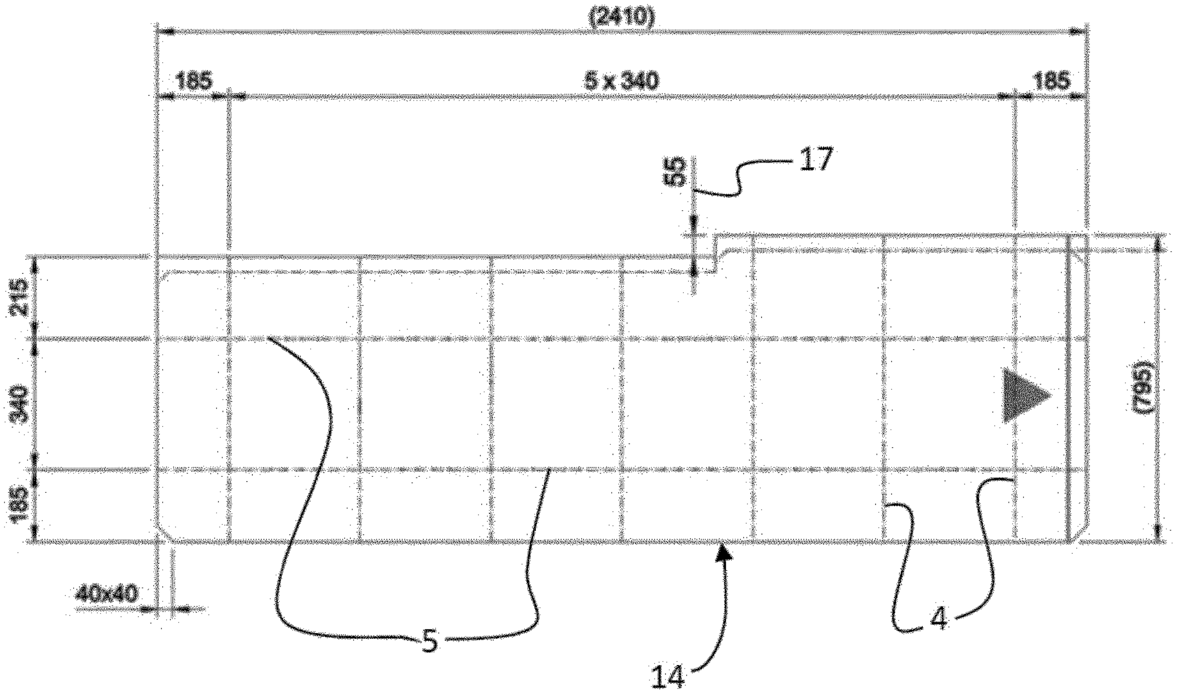

[Fig.7]
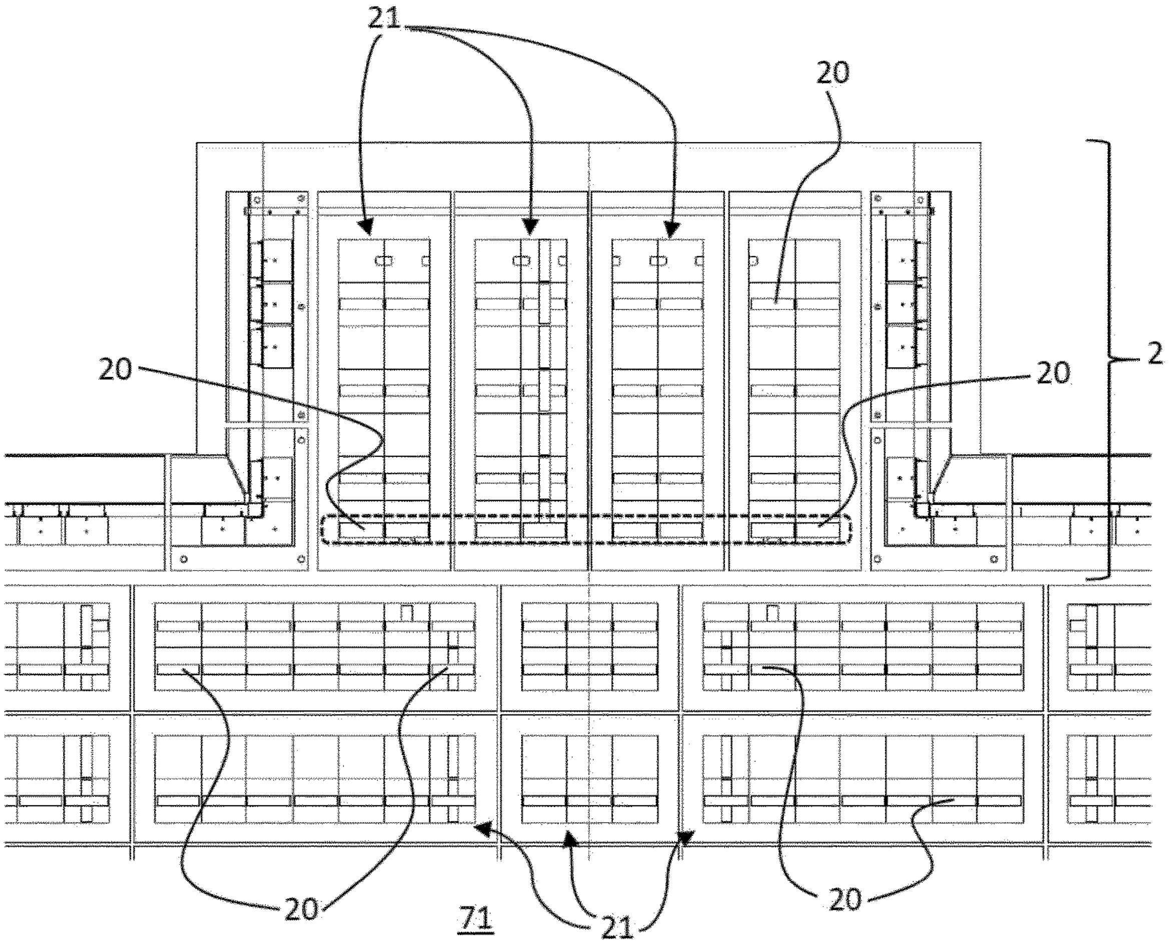

[Fig.8]
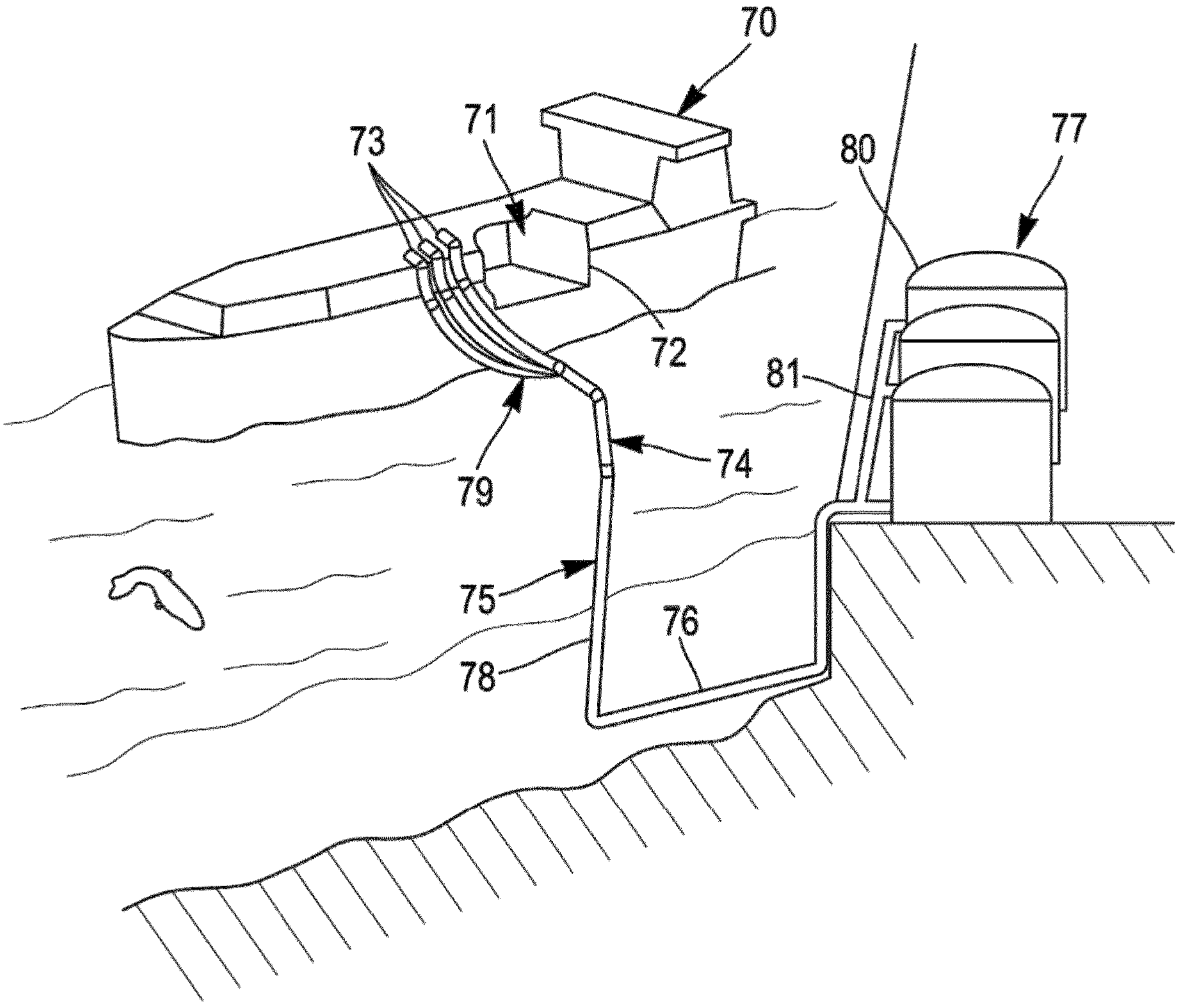

METHOD FOR ASSEMBLING AND INSTALLING A LIQUEFIED GAS STORAGE TANK

The invention relates to the field of liquefied gas storage installations comprising a sealed and thermally insulated membrane tank. In particular, the invention relates to the field of sealed and thermally insulating tanks for storing and/or transporting liquefied gas at low temperatures, such as tanks for transporting liquefied petroleum gas (also called LPG) having for example a temperature of between −50° C. and 0° C., or for transporting liquefied natural gas (LNG) at approximately −162° C. at atmospheric pressure. These tanks can be installed on shore or on a floating structure. In the case of a floating structure, the tank can be for transporting liquefied gas or receiving liquefied gas used as a fuel to propel the floating structure.

FR2991430 describes a liquefied gas storage installation comprising a sealed and thermally insulating tank incorporated into a load-bearing structure consisting of the double hull of a vessel. Each wall of the tank comprises a secondary thermally insulating barrier, a secondary sealing membrane, a primary thermally insulating barrier and a metal or metal alloy primary sealing membrane.

The primary sealing membrane conventionally comprises corrugations suitable for permitting thermal contractions, without failure of the membrane, these corrugations conventionally forming a network of small and large corrugations extending parallel to each other respectively so as to form a grid delimited by node zones, i.e. the generally perpendicular intersections of the small and large corrugations.

In a zone situated at the top of the tank, the tank includes a chimney-shaped protruding portion. In this zone, the load-bearing structure is locally interrupted so as to define a loading/unloading opening through which fluid loading/unloading pipes can pass. This loading/unloading opening and this chimney-shaped duct, known as the liquid dome, include insulation or a thermally insulating barrier, together with an element forming a primary sealing membrane.

As can be seen in the appended FIGS. 1 and 2, this liquid dome is conventionally situated at one longitudinal end of the tank so that one of the vertical walls of the liquid dome is continued or extended, in the same plane, by a vertical wall of the main structure of the tank (containing a cold fluid). When the tanks are present in a vessel for transporting cold fluid such as LNG or LPG, i.e. a liquid natural gas carrier (LNGC), this vertical wall common to the liquid dome and the main structure of the tank is known as a cofferdam wall.

The tank is installed in a structure subject to very high mechanical stresses, such as a vessel, which bends and twists as a function of the conditions of its environment. As the load-bearing structure is interrupted at the liquid dome, these mechanical stresses are even more significant at that point.

The walls of the main structure of the tank are mounted and assembled/fastened and the walls of the liquid dome are mounted and assembled/fastened separately, and these two parts of the storage installation are then sealably connected to each other.

Due in particular to the sizes of the primary insulation membranes, the membranes are connected and the continuity of the corrugations is provided by a connecting sheet, generally with small dimensions, fastened by welding to the adjacent membranes of the liquid dome and of the main structure of the tank.

This connecting sheet is not a satisfactory solution.

Firstly, in order to ensure the continuity of the vertical corrugations between the liquid dome and the main structure of the tank, the operators are obliged to deform the connecting sheet in situ using striking tools, as the corrugations of the two parts—the liquid dome on the one hand and the main structure on the other—are not aligned. This operation is painstaking for the operators and typically requires several hours of work.

Then, the shaping of this connecting sheet at its vertical corrugations weakens it. As mentioned above, this zone of a vessel is subject to high mechanical stresses. This is why it is unacceptable for a portion of the primary sealing membrane to be able to fail and compromise the sealing of the storage installation.

After various experiments and tests, the applicant has observed that it is possible to dispense with this connecting part, or sheet portion, by proposing an assembly solution that is simpler and faster, while making it possible to make this connecting zone between the primary membranes of the main structure of the tank and those of the liquid dome more reliable in terms of both mechanical strength and sealing.

The present invention thus relates to a liquefied gas storage installation comprising a load-bearing structure and a sealed and thermally insulating tank arranged in the load-bearing structure,

- the sealed and thermally insulating tank including a main structure made up of a plurality of tank walls connected to each other and fastened to the load-bearing structure, the main structure defining an internal storage space, the main structure comprising at least one sealing membrane and at least one thermally insulating barrier, the thermally insulating barrier being placed between the sealing membrane and the load-bearing structure;
- the sealing membrane, the thermally insulating barrier of the main structure and a so-called upper load-bearing wall being locally interrupted so as to define a duct forming a load-bearing wall of a chimney extending along a vertical axis to an upper end consisting of a loading/unloading opening through which liquefied gas loading/unloading pipes can pass, said duct leading to said opening defining a liquid dome of the tank including, like the main structure of the tank, at least one sealing membrane and at least one thermally insulating barrier, the thermally insulating barrier being placed between the sealing membrane and the load-bearing wall;
- the liquid dome being situated at one axial end of the tank, a vertical wall of the main structure of the tank, referred to as the cofferdam wall, extends from said main structure to form, along the same plane, a wall of the duct of the liquid dome;
- the sealing membranes of the main structure and of the liquid dome are made up of a plurality of flat metal membranes, sealably fastened together, each having at least two rows of perpendicular corrugations, the shape and dimensions of these two rows of corrugations being respectively identical for all of the membranes so that these juxtaposed membranes display a repeating pattern.

The invention is characterized in that so-called adjacent membranes of the sealing membrane of the cofferdam wall of the main structure of the tank protrude at least partially into the liquid dome, said so-called adjacent membranes being directly sealably fastened to so-called adjacent membranes of the liquid dome.

The applicant has thus observed after multiple tests and analyses that it is possibly to firmly and completely sealably connect the main structure of the tank to the liquid dome, while optimizing the mounting or assembly time of the respective membranes of these two parts of a liquefied gas storage installation, without using a connecting sheet.

In so doing, the invention makes possible substantial savings in the production of the liquid dome while ensuring or retaining a complete seal against the liquefied gas and excellent mechanical resilience of the liquid dome to all of the stresses to which it is typically subject.

The expression “sealably” used in relation to the fastenings, in particular between membranes, is given to mean that the fastening is carried out by welding, optionally supplemented by chemical fastening, by adhesive bonding, and/or mechanical fastening, for example using a seal.

The term “metal”, particularly in relation to the membranes, is given to mean a metal or a metal alloy, usually a metal alloy such as a steel.

The term “membrane” refers systematically to a sealed membrane, impermeable to fluid, whether or not the term is accompanied by the term “sealed”. A membrane is classed as such within the scope of the present invention if it has, on the cofferdam wall, at least one row of vertical corrugations, preferably a plurality of vertical corrugations, and at least one row of horizontal corrugations. In the embodiment chosen to illustrate the invention, the vertical corrugations of/on the cofferdam wall are small corrugations, while the horizontal corrugations are large corrugations.

The term “corrugation”, singular or plural, refers to an element present on a membrane to permit the deformation thereof, by contraction and/or stretching, under the effect of thermal expansion linked to the presence or absence of a cold or very cold liquefied gas in the tank. The two perpendicular rows of corrugations defining a membrane within the scope of the present invention can be identical or different shapes. Hereinafter, these two rows of corrugations are advantageously different, with a horizontal row of large corrugations and a vertical row of small corrugations.

The term “adjacent”, mainly in relation to the membranes, of the liquid dome and of the main structure of the tank, refers to the fact that these membranes are closest to the other part of the tank, that is, to the main structure for membranes situated in the liquid dome and to the liquid dome for membranes situated in the main structure.

The term “duct” is given to mean that it forms the external wall of the liquid dome, more specifically the wall of the chimney emerging into the tank containing the liquefied gas, the term “chimney” referring to the general shape of the liquid dome, which extends vertically.

Further advantageous features of the invention are set out briefly below:

Preferably, the flat metal membranes forming the sealing membrane of the main structure and of the liquid dome have a rectangular shape with two long sides and two short sides.

Preferably, the flat metal membranes include a raised portion extending along two adjacent sides suitable for overlapping the adjacent side of another membrane.

Advantageously, the thermally insulating barriers of the main structure and of the liquid dome of the tank include metal plates to which the sealing membranes of the main structure and of the liquid dome are discontinuously welded.

Advantageously, the so-called adjacent membranes of the liquid dome include a raised portion extending along the lower long side while the so-called directly adjacent membranes of the main structure of the tank include a raised portion extending along one of the two short sides of the membrane. According to a particular example, the so-called directly adjacent membranes of the main structure of the tank include just one raised portion extending along one of the two short sides of the membrane.

According to a particular embodiment, when these so-called adjacent membranes are mounted and assembled after the other membranes of the liquid dome, which is a preferred embodiment of the invention, the so-called adjacent membranes of the liquid dome include a raised portion extending along the two opposite long sides while the so-called directly adjacent membranes of the main structure of the tank include just one raised portion extending along one of the two short sides of the membrane respectively.

According to a particular feature of the invention, the protruding part of the so-called adjacent membranes of the sealing membrane of the cofferdam wall (B) of the main structure of the tank preferably protrudes by at least 30 millimetres into the liquid dome, preferably by 55 millimetres.

According to a particular feature of the invention, the protruding part of the so-called adjacent membranes of the sealing membrane of the cofferdam wall (B) of the main structure of the tank protrudes by at most 60 millimetres into the liquid dome.

It will be noted here that the expression “of the cofferdam wall”, i.e. the wall identified as B or B' in FIG. 2, particularly in relation to the main structure of the tank, is superfluous, as the only membranes relevant to the present invention in the embodiment selected to illustrate it are the membranes of the cofferdam wall, as this wall is the only one that extends vertically, in other words without a change in angle, into the liquid dome.

Of course, the invention would also apply if for example the liquid dome were in a corner of the main structure, so that in addition to the cofferdam wall, a side wall—wall F in FIG. 2, if there were no chamfers E—would extend vertically into the liquid dome. This scenario is covered by the present invention even though such an arrangement of the liquid dome, in a corner of the tank, is theoretically disadvantageous and impractical.

Advantageously, the so-called adjacent membranes of the liquid dome have a length of between 500 millimetres and 3,300 millimetres and a width of between 200 millimetres and 800 millimetres.

Advantageously, the so-called adjacent membranes of sealing membrane of the cofferdam wall of the main structure of the tank have a length of between 500 millimetres and 3,300 millimetres and a width of between 200 millimetres and 800 millimetres.

According to another advantageous aspect of the invention, the so-called adjacent membranes of the sealing membrane of the cofferdam wall of the main structure of the tank are in two rows of parallel membranes, one row of membranes having a width of between 200 and 400 millimetres and the other row of membranes having a width of between 700 and 800 millimetres.

The invention also relates to a method for assembling a storage installation as described above, in which it comprises:

- a first step of sealably assembling and fastening the sealing membrane assembly of the cofferdam wall of the main structure of the tank;
- a second step of sealably assembling and fastening the sealing membrane assembly of the liquid dome, with the exception of the adjacent membranes of said liquid dome; the first and second steps being performed in any order or simultaneously;

and a final step of sealably assembling and fastening the so-called adjacent membranes of said liquid dome so that the assembly of the cofferdam wall, of the main structure and of the liquid dome, is sealed.

The invention relates to a vessel for transporting a cold liquid product, the vessel including a double hull and a storage installation as described above arranged in the double hull.

The invention also relates to a system for transferring a cold liquid product, the system including a vessel as described above, insulated pipes arranged so that they connect the tank installed in the hull of the vessel to a floating or onshore external storage installation and a pump for conveying a stream of cold liquid product through the insulated pipes from or to the floating or onshore external storage installation to or from the tank of the vessel.

Finally, the present invention relates to a method for loading or unloading a vessel as described above, in which a cold liquid product is conveyed through insulated pipes from or to a floating or onshore external storage installation from or to the tank of the vessel.

The invention will be more clearly understood, and further aims, details, features and advantages thereof will become more apparent from the following description of several specific embodiments of the invention, given by way of non-limiting illustration only, with reference to the appended drawings.

FIG. 1 is a diagrammatic perspective cross-sectional view of a liquefied gas carrier or LNGC.

FIG. 2 is a cut-away cross-sectional view of a tank of the vessel shown in FIG. 1.

FIG. 3 is a diagrammatic view illustrating a sealing membrane with three parallel rows of large corrugations and nine parallel rows of small corrugations, the two types of row being perpendicular to each other.

FIG. 4 is a diagrammatic view illustrating the arrangement of the membranes in the zone of the liquid dome and of the main structure of the tank, with indication of the overlap of each membrane relative to its neighbour.

FIG. 5 is an enlarged view of a portion P in FIG. 4.

FIG. 6 is a detailed view with dimensions of an adjacent membrane, known as a side membrane, of the main structure of the tank.

FIG. 7 is an identical view to the one in FIG. 4, illustrating thermal insulation blocks present under the membranes, with in particular the metal plates used to fasten the membranes to these thermal insulation blocks by welding.

FIG. 8 is a cut-away diagrammatic representation of a methane carrier storage installation and a terminal for loading/unloading this tank.

Here, the term "vertical" means extending in the direction of Earth's gravitational field. Here, the term "horizontal" means extending in a direction perpendicular to the vertical direction.

When the storage installation is positioned on a vessel 70 such as a methane carrier, the load-bearing structure, not visible in the appended drawings, is formed by the double hull of the vessel. The external upper load-bearing wall is known as the external deck of the vessel.

Hereinafter, the present invention is illustrated with a conventional liquefied gas carrier 70, namely a liquid natural gas carrier or LNGC, but the invention can of course apply to other types of tank provided that such a tank includes a sealing membrane, known as primary due to its direct contact with a fluid contained in the tank and the optional presence of a second sealing membrane, and a liquid dome 2 or similar, that is, a chimney and an opening for loading/unloading said fluid, having at least one wall face continuing on from a wall of the main structure of the tank 71, 71'. If these two features are confirmed, the present invention can apply to such a fluid storage installation.

FIG. 1 thus shows the distribution of the four LNG tanks 71, 71' conventionally present in a LNGC 70. As seen above, three of the four tanks 71 thus have the same dimensions while a last tank, 71', situated at the bow of the vessel 70, has smaller dimensions, in particular so that the ballast, arranged laterally and underneath the tank 71', has much larger dimensions than the other ballast, situated around the other three tanks 71, in order to more easily equalize the trim of the vessel 70, given that most of the weight of the vessel 70 is situated behind this tank when the tanks 71 are empty.

The machines or machine room, not visible in the appended figure, for managing the entire vessel 70, from propulsion to all of the circuits for generating and supplying power to the various items of equipment on the vessel 70, are conventionally situated at the stern of the vessel 70. In addition, above the machines is the bridge 31, which conventionally consists of a tower or similar, in which the crew accommodation and the control room of the vessel in particular are located.

A tank 71 includes a main structure made up of a front wall D, a rear wall B, a ceiling wall A, a bottom wall C and two side walls F, not both visible in the appended FIG. 2 (as one side of the tank is not visible in this figure), connecting the bottom wall C to the ceiling wall A, and finally two to four chamfer walls E, G connecting the side walls F to the bottom wall C or to the ceiling wall A. The walls of the tank 71 are thus connected to each other so as to form a polyhedral structure and define an internal storage space. The tank 71' is substantially identical to a tank 71.

In order to load and unload liquefied gas into or from the tank 71, the storage installation includes a loading/unloading opening that locally interrupts the external upper load-bearing wall, the internal upper load-bearing wall and the ceiling wall of the tank 71, so as to allow in particular loading/unloading pipes, not shown in the appended figures, to reach the bottom of the tank 71 by passing through this opening.

The storage installation also comprises a loading/unloading tower, not visible in the appended figures, situated in line with the opening of the liquid dome 2 and the inside of the tank 71, forming a support structure for the loading/unloading pipes over the entire height of the tank 71, as well as for the pumps (not shown).

The tank 71 thus includes a chimney, or duct, situated on or above the main structure and allowing the tank walls to extend continuously from the internal deck to the external deck, where they are interrupted by the loading/unloading opening. For liquefied gas storage tanks 71, 71', such a chimney, or duct, provided with a cover closing said loading/unloading opening, is known as the liquid dome 2.

The loading/unloading opening and the chimney conventionally have a rectangular or square outline or action. The chimney thus comprises four walls, one B' being the extension of the rear wall B, also referred to as the "cofferdam wall" of the main structure of the tank 71, 71', as can be seen in FIG. 2, while the other three are connected to the ceiling wall A, forming a 90° therewith.

The present invention relates solely to the wall B, B', or to the two walls in a different embodiment, continuous or extending without a change in angle between the main structure of the tank 71, 71' and the liquid dome 2, more specifically to the sealing membrane and its junction between the main structure of the tank 71, 71' and the liquid dome 2.

FIG. 3 shows such a conventional sealing membrane 3. A sealing membrane is defined, within the scope of the present invention, as a metal or metal alloy sheet including at least a first row of corrugations 4 and at least a second row of corrugations 5, the first and second rows of corrugations 4, 5 extending perpendicular to each other.

According to one embodiment, the main structure of the tank 71, 71' is produced using Mark III® technology, which is described in particular in FR-A-2691520.

In such a main structure, the secondary thermally insulating barrier, the primary thermally insulating barrier and the secondary sealing membrane mainly consist of panels juxtaposed on the load-bearing structure, which can be the internal load-bearing structure or the structure connecting the internal upper load-bearing wall to the external upper load-bearing wall at the opening. The secondary sealing membrane is made up of a composite material including a sheet of aluminium sandwiched between two sheets of glass fibre fabric. The primary sealing membrane is obtained by assembling a plurality of metal plates, welded to each other along their edges, and including corrugations extending in two perpendicular directions. The metal plates are, for example, made from stainless steel or aluminium, shaped by bending or stamping.

More particularly, in order to illustrate an embodiment of the invention, the sealing membrane is a so-called primary sealing membrane (as it is in direct contact with the fluid stored in the tank 71, 71') obtained by assembling a plurality of corrugated metal sheets according to the membrane shown in FIG. 3. Each corrugated metal membrane 3 includes a first series of so-called high or large parallel corrugations 5, extending in a first direction, and a second series of so-called low or small parallel corrugations 4, extending in a second direction perpendicular to the first series. The node zones 6 are the zones in which these two types of corrugation 4, 5 intersect. The corrugations 4, 5 protrude towards the inside of the tank 71, 71'. As mentioned above, these corrugated metal membranes 3 are, for example, made from stainless steel or aluminium.

The corrugated metal membranes 3 are fastened to insulating panels 21 by means of metal plates 20 extending in two perpendicular directions, vertically and horizontally on the cofferdam wall B, B', these plates 20 being fastened to the internal face (oriented towards the internal space of the tank) of the insulating panels 21. Each insulating panel 21 thus has an internal face provided with metal plates 20 to which the corrugated metal membranes 3 forming the primary sealing membrane are welded. These insulating panels 21 to which the sealing membranes 3 are fastened can be seen, with the aforementioned metal plates 20, in the appended FIG. 7.

The metal plates 20 extend in two perpendicular directions, which are each parallel to two opposite edges of the insulating panels 21. The metal plates 20 are fastened in recesses made in the internal face of the insulating panel 21 and fastened thereto, using screws, rivets or clips, for example.

The appended FIGS. 4 to 7 illustrate the actual arrangement of the sealing membrane 3, or primary sealing membrane, on the wall B of the main structure of the tank 71, 71' and the wall B' continuing on from the wall B in the liquid dome 2.

The first feature of such an arrangement lies in the use of sealing membranes 3, 13, 13', 33 only, which include at least two rows 4, 5 of corrugations perpendicular to each other, to ensure the continuity of the sealing between these two walls, the cofferdam wall B of the main structure of the tank 71, 71' and the continuing wall B' of the liquid dome 2. No intermediate elements are thus present in this zone, it being understood that an "intermediate element" such as a metal sheet, is not a sealing membrane 3, 13, 13', 33 according to the present invention, that is, the definition of a membrane given above.

The second feature of such an arrangement according to the invention lies in the protrusion of the sealing membrane 13 of the main structure of the tank 71, 71' directly adjacent to the liquid dome 2, i.e. the three membranes 14, 15, 16 visible in FIG. 4, into the liquid dome 2, that is, into the space forming this liquid dome 2 from the opening present in the ceiling wall A, the insulating and sealing elements here being considered in order to define the location of this opening of the liquid dome 2.

As can be seen in FIG. 6, the protrusion 17 of the sealing membrane 13 into the liquid dome 2 is 55 millimetres in this example. Generally, this protrusion 17 is at least 30 millimetres and at most 60 millimetres. As can be seen clearly in FIG. 6, in order to produce this protrusion 17, either the adjacent membrane 13 protrudes over its entire width, as is the case of the central membrane 15, or the adjacent membrane protrudes over part of its width only, as is the case for the side membranes 14 and 16. For these so-called side membranes 14 and 16, a cut-out is made in a conventional membrane, for example using a laser or a saw, in order to remove the portion that is not adjacent to the liquid dome 2 and does not therefore protrude into the liquid dome 2.

Another specific feature of the present invention lies in the dimensions of the adjacent membranes 13, 13', 33 of both the liquid dome 2 and the main structure of the tank 71, 71'. These dimensions are not conventional and have been selected so that the connection between the membranes 13, 13' of the main structure of the tank 71, 71' and the membranes 33 of the liquid dome 2 fits perfectly and as securely as possible. A conventional membrane 3 of the main structure of the tank 71, 71' thus usually includes three rows 5 of large corrugations, whereas the adjacent membranes 13, 13' of the main structure of the tank 71, 71' include just two rows 5 of large corrugations for the directly adjacent membrane 13, or even a single/sole row 5 of large corrugations for the adjacent membrane 13'. Likewise, a conventional membrane 3 of the liquid dome 2 usually includes two rows 5 of large corrugations, whereas the adjacent membranes 33 of the liquid dome 2 include just a single/sole row 5 of large corrugations.

By way of non-limiting example, FIG. 6 shows the dimensions, expressed in millimetres, of the adjacent side membrane 14 of the main structure of the tank 71, 71', with in particular a protrusion 17 of 55 millimetres resulting from a prior cut-out made in the membrane 14. FIGS. 4 and 5 show the membranes 13, 13' and 33, part of the main structure of the tank 71, 71' and the liquid dome 2 to scale, and the dimensions, or more exactly the domains or ranges of dimensions of each of the membranes 13, 13' and 33 can be deduced using the knowledge of the dimensions given precisely for the adjacent side membrane 14 in FIG. 6. Of course, it will be remembered here that the precise dimensions given in FIG. 6 represent just one embodiment, and other embodiments of the invention can be envisaged, and the dimensions given in FIG. 6 can vary, with the exception of the protruding part 17, within a domain or range of ±30 millimetres (mm), preferably ±15 mm at most. For the protruding part 17, it will be noted that it cannot be less than 30 millimetres or greater than 60 millimetres.

Another specific feature of the invention lies in the adjacent membranes 33 of the liquid dome 2 having, on their two lower/upper faces 34, 35, or the two opposite long sides, a raised portion 7 extending along said two faces or sides 34, 35 so as to overlap the two lower and upper membranes to which they are respectively fastened. It must be noted here that only the lower raised portion 7 is essential within the scope of the present invention, in which the adjacent membranes 33 of the liquid dome must be mounted and assembled after those of the main structure of the tank 71, 71'.

This particular feature of these adjacent membranes 33 is justified by the assembly method specific to the storage installation according to the invention, in which these adjacent membranes 33 of the liquid dome 2 are advantageously assembled last, once the sealing membranes of the liquid dome 2 have been assembled and fastened and the sealing membranes of the main structure of the tank 71, 71' (or at least the membranes situated near the liquid dome 2) have also been assembled and fastened. In so doing, the directly adjacent membranes 13 of the main structure of the tank 71, 71' only have a single raised portion 7, more specifically on one of the short sides (width).

It must be noted that a conventional membrane 3, like that shown in FIG. 3, has two raised portions 7 extending along two adjacent sides of the membrane 3, i.e. one of the short sides defining the width of the membrane 3 and one of the long sides of the membrane 3. As will be noted in FIGS. 4 to 6, the black isosceles triangles indicate, due to the orientation of the tip of said triangle, the position of the raised portion 7 so that the membrane on which the black isosceles triangle is situated overlaps the adjacent membrane along this raised portion 7, on the short or long side in question. FIG. 4 in particular is very explicit about the relative mounting or assembly of the different membranes, whether they are the membranes 3, 33 of the liquid dome 2 or the membranes 3, 13, 13' of the main structure of the tank 71, 71'.

FIG. 7 illustrates the thermal insulation blocks 21 with which a liquefied gas storage installation is provided. Within the scope of the present invention, these thermal insulation blocks 21 are not modified with respect to the prior art and details of such thermal insulation blocks 21 are described in particular in FR-A-2861060. Nevertheless, a specific feature of the present invention lies in the metal plates 20, described above, situated on these thermal insulation blocks 21, facing the membranes 3, 13, 13', 33 so as to fasten the membranes 3, 13, 13', 33 to the thermal insulation block 21 by welding or bonding by means of these metal plates 20. Here, these metal plates 20, also known as anchoring strips (AS), are arranged in a suitable manner for the adjacent membranes 13, 13', 33 and the membranes 13, 13' of the main structure of the tank 71, 71', and for the membranes 33 of the liquid dome 2.

The adjacent membranes 33 of the liquid dome 2 are thus situated immediately next to metal plates 20, so that they have a discontinuous weld line extending over more than 70% of their length, when these membranes 33 are not wide as they have just one row 5 of large corrugations. By comparison, the other membranes 3 of the liquid dome 2 have two rows 5 of large corrugations and have just one discontinuous weld line on plates 20, representing more than 70% of their length. The small adjacent membranes 13' of the main structure of the tank 71, 71' are also provided with such a discontinuous weld line when they also only have a sole/single row 5 of large corrugations, like the membranes 33.

With reference to FIG. 8, a cut-away view of a methane carrier 70 shows a sealed and insulated tank 71 with a generally prismatic shape assembled in the double hull 72 of the vessel. The wall of the tank 71 includes a primary sealing membrane suitable for being in contact with the LNG contained in the tank, a secondary sealing membrane arranged between the primary sealing membrane and the double hull 72 of the vessel, and two insulating barriers respectively arranged between the primary sealing membrane and the secondary sealing membrane and between the secondary sealing membrane and the double hull 72.

In a manner known per se, loading/unloading pipes 73 arranged on the upper deck of the vessel can be connected, by means of appropriate connectors, to a marine or harbour terminal in order to transfer a cargo of LNG from or to the tank 71.

FIG. 8 shows an example of a marine terminal including a loading and unloading station 75, a subsea pipeline 76 and an onshore installation 77. The loading and unloading station 75 is a fixed offshore installation including a mobile arm 74 and a tower 78 that supports the mobile arm 74. The mobile arm 74 holds a bundle of insulated flexible hoses 79 that can be connected to the loading/unloading pipes 73. The orientable mobile arm 74 is suitable for all sizes of methane carrier. A connecting pipeline, not shown, extends inside the tower 78. The loading and unloading station 75 makes it possible to load and unload the methane carrier 70 from or to the onshore installation 77. The latter includes liquefied gas storage tanks 80 and connecting pipelines 81 connected by the subsea pipeline 76 to the loading or unloading station 75. The subsea pipeline 76 makes it possible to transfer liquefied gas between the loading or unloading station 75 and the onshore installation 77 over a long distance, for example 5 km, which makes it possible to keep the methane carrier 70 a long distance from the coast during the loading and unloading operations.

In order to generate the pressure necessary for transferring the liquefied gas, pumps on board the vessel 70 and/or pumps provided at the onshore installation 77 and/or pumps provided on the loading and unloading station 75 are implemented.

Although the invention has been described with reference to several specific embodiments, it is obvious that it is in no way limited thereto and that it includes all technical equivalents of the means described and any combinations thereof if these fall within the scope of the invention.

The use of the verb "include" or "comprise" and its conjugated forms does not rule out the presence of elements or steps other than those set out in a claim. The use of the indefinite article "one" for an element or a step does not rule out, unless otherwise stated, the presence of a plurality of such elements or steps.

In the claims, any reference sign in brackets cannot be interpreted as limiting the claim.

The invention claimed is:

1. A liquefied gas storage installation comprising:

a load-bearing structure; and a sealed and thermally insulating tank arranged in the load-bearing structure, the sealed and thermally insulating tank including a main structure made up of a plurality of tank walls connected to each other and fastened to the load-bearing structure, the main structure defining an internal storage space, the main structure comprising at least one sealing membrane and at least one thermally insulating barrier, the thermally insulating barrier being placed between the sealing membrane and the load-bearing structure;

the sealing membrane, the thermally insulating barrier of the main structure and a so-called upper load-bearing wall being locally interrupted so as to define a duct forming a load-bearing wall of a chimney extending along a vertical axis to an upper end consisting of a loading/unloading opening through which liquefied gas loading/unloading pipes can pass, said duct leading to said opening defining a liquid dome of the tank including the main structure of the tank, at least one sealing membrane and at least one thermally insulating barrier, the thermally insulating barrier being placed between the sealing membrane the load-bearing wall, the liquid dome being situated at one axial end of the tank, a vertical wall of the main structure of the tank, referred to as the cofferdam wall, extends from said main structure to form, along the same plane, a wall of the duct of the liquid dome;

wherein the sealing membrane of the main structure and the sealing membrane of the liquid dome are made up of a plurality of flat metal membranes, sealably fastened together, each having at least two perpendicular rows of corrugations, the shape and dimensions of these two rows of corrugations being respectively identical for all of the membranes so that these juxtaposed membranes display a repeating pattern, wherein so-called adjacent membranes of the sealing membrane of the cofferdam wall of the main structure of the tank protrude at least partially into the liquid dome, said so-called adjacent membranes being directly sealably fastened to so-called adjacent membranes of the liquid dome.

2. The storage installation according to claim 1, in which the flat metal membranes forming the sealing membrane of the main structure and of the liquid dome have a rectangular shape with two long sides and two short sides.

3. The storage installation according to claim 1, in which the flat metal membranes include a raised portion extending along two adjacent sides suitable for overlapping the adjacent side of another membrane.

4. The storage installation according to claim 1, in which the thermally insulating barrier of the main structure and the thermally insulating barrier of the liquid dome of the tank include metal plates to which the sealing membrane of the main structure and the sealing membrane of the liquid dome are discontinuously welded.

5. The storage installation according to claim 2, in which the so-called adjacent membranes of the liquid dome include a raised portion extending along a lower long side while the so-called directly adjacent membranes of the main structure of the tank include a raised portion extending along one of the two short sides of the membrane.

6. The storage installation according to claim 1, in which a protruding part of the so-called adjacent membranes of the sealing membrane of the cofferdam wall of the main structure of the tank protrudes by at least 30 millimetres into the liquid dome.

7. The storage installation according to claim 1, in which a protruding part of the so-called adjacent membranes of the sealing membrane of the cofferdam wall of the main structure of the tank protrudes by at most 60 millimetres into the liquid dome.

8. The storage installation according to claim 1, in which the so-called adjacent membranes of the liquid dome have a length of between 500 millimetres and 3,300 millimetres and a width of between 200 millimetres and 800 millimetres.

9. The storage installation according to claim 1, in which the so-called adjacent membranes of the sealing membrane of the cofferdam wall of the main structure of the tank have a length of between 500 millimetres and 3,300 millimetres and a width of between 200 millimetres and 800 millimetres.

10. The storage installation according to claim 9, in which the so-called adjacent membranes of the sealing membrane of the cofferdam wall of the main structure of the tank are in two rows of parallel membranes, one row of membranes having a width of between 200 and 400 millimetres and the other row of membranes having a width of between 700 and 800 millimetres.

11. A method for assembling a storage installation according to claim 1, the method comprising:

sealably assembling and fastening the sealing membrane assembly of the cofferdam wall of the main structure of the tank;

sealably assembling and fastening the sealing membrane assembly of the liquid dome, with the exception of the adjacent membranes of said liquid dome, the first and second steps being performed in any order or simultaneously; and sealably assembling and fastening the so-called adjacent membranes of said liquid dome so that the assembly of the cofferdam wall, of the main structure and of the liquid dome, is sealed.

12. A vessel for transporting a cold liquid product, the vessel including a double hull and a storage installation according to claim 1 arranged in the double hull.

13. A system for transferring a cold liquid product, the system comprising:

a vessel according to claim 12;

insulated pipes arranged so that they connect the tank installed in the hull of the vessel to a floating or onshore external storage installation; and a pump for conveying a stream of cold liquid product through the insulated pipes from or to the floating or onshore external storage installation to or from the tank of the vessel.

14. A method for loading or unloading a vessel according to claim 12, in which a cold liquid product is conveyed through insulated pipes from or to a floating or onshore external storage installation to or from the tank of the vessel.

* * * * *